United States Patent [19]

Krishnan et al.

[11] Patent Number: 5,453,784
[45] Date of Patent: Sep. 26, 1995

[54] IMAGING APPARATUS AND METHOD FOR DETERMINING RANGE AND DETERMINING FOCUS INFORMATION

[76] Inventors: Arun Krishnan, 2070 S. Orchard Rd. Apt. B, Urbana, Ill. 61801; Narendra Ahuja, 1405 Country Lake Dr., Champaign, Ill. 61821

[21] Appl. No.: 15,981

[22] Filed: Feb. 10, 1993

[51] Int. Cl.⁶ ................................................ H04N 5/232
[52] U.S. Cl. ........................ 348/348; 348/351; 354/402
[58] Field of Search ......................... 358/227, 225, 358/909, 213.28; 354/400, 402; 359/362, 363, 554–557; 250/204; 348/143, 207, 335, 345, 348, 349, 351, 361; H04N 5/232, 5/225

[56] References Cited

U.S. PATENT DOCUMENTS

| | | | |
|---|---|---|---|
| 4,458,145 | 7/1984 | Voles | 250/204 |
| 4,614,974 | 9/1986 | Toyama | 358/227 |
| 4,794,417 | 12/1988 | Sekiguchi et al. | 354/400 |
| 4,924,247 | 5/1990 | Suzuki | 354/164 |
| 4,941,009 | 7/1990 | Yoshida | 354/402 |
| 4,963,962 | 10/1990 | Kruegle | 358/108 |
| 5,030,981 | 7/1991 | Matsuzaki et al. | 354/402 |
| 5,033,856 | 7/1991 | Nose et al. | 356/376 |
| 5,044,738 | 9/1991 | Shaffer | 359/504 |
| 5,051,766 | 9/1991 | Nonaka et al. | 354/400 |
| 5,101,278 | 3/1992 | Itsumi | 358/227 |
| 5,151,609 | 9/1992 | Nakagawa et al. | 250/561 |
| 5,168,298 | 12/1992 | Hirai | 354/402 |
| 5,177,605 | 1/1993 | Takahashi | 358/98 |

FOREIGN PATENT DOCUMENTS 60134671 7/1985 Japan ............................ H04N 5/225

OTHER PUBLICATIONS

"Vision-based Planetary Rover Navigation", by Brian W. Wilcox, SPIE vol. 1360 Visual Communications and Image Processing 1990.

Correspondence among Mr. Brian W. Wilcox, Dr. Swain and Mr. Arun Krishran dated Mar. 23–25, 1993; Apr. 30, 1993; and May 12, 1993.

Primary Examiner—Wendy R. Greening
Attorney, Agent, or Firm—Baker & Botts

[57] ABSTRACT

A camera having an image plane which is adjustable with respect to the optical axis is used to determine range information from focus. This imaging geometry eliminates the usual focusing need of image plane movement by replacing the two standard mechanical actions of focusing and panning by panning alone. Range estimation or generation of a focused image of a scene can therefore be performed substantially at the speed of panning.

23 Claims, 7 Drawing Sheets

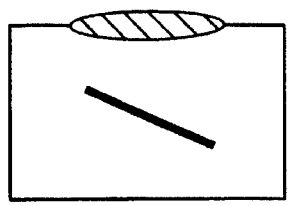
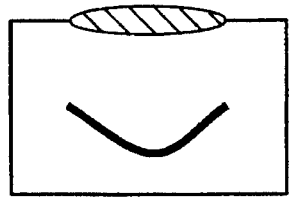
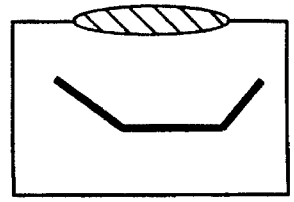
Fig. 4 A    Fig. 4 B    Fig. 4 C
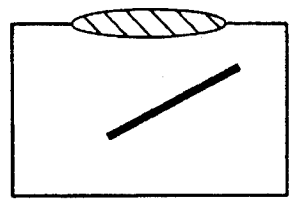
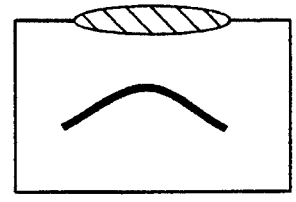
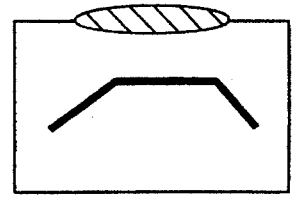
Fig. 4 D    Fig. 4 E    Fig. 4 F
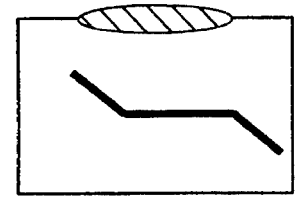
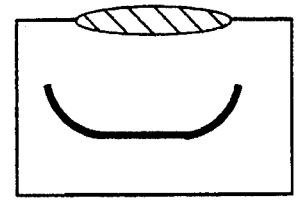
Fig. 4 G    Fig. 4 H
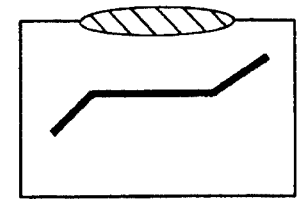
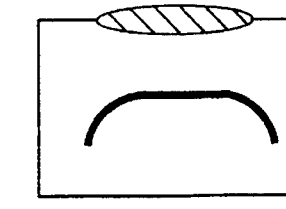
Fig. 4 I    Fig. 4 J

IMAGING APPARATUS AND METHOD FOR DETERMINING RANGE AND DETERMINING FOCUS INFORMATION

FIELD OF THE INVENTION

The invention relates to an imaging apparatus and method for determining range and focus information.

BACKGROUND OF THE INVENTION

Range-from-focus techniques commonly are based on solving the standard lens law:

$$\frac{1}{u} + \frac{1}{v} = \frac{1}{f}.$$

Typically, f (the focal length of the lens or lens system) is known. Therefore, by determining the value of v (the focus distance) corresponding to the distance between the lens center and an image plane which causes an object or image to be in focus, u (the depth value or range) can be calculated. Typically, to determine the v value, the distance (s) of the image plane from the lens is varied until the distance corresponding to the focus for an object or image is obtained. This focus determination is made by processing the detected image information according one or more well known focus determination algorithms. As used herein, s shall refer to the distance between the lens center and an image element of the imaging array. For a given scene point located at a given distance from the lens, the s value which produces the sharpest focus for the scene point is equivalent to the v value. That is to say, when a given scene point is in focus, s=v. In known imaging devices, the imaging elements along an image plane are typically aligned linearly and are each equidistant from a reference plane, e.g., a plane which passes through the lens center and which is perpendicular to the optical axis of the lens. For this arrangement, the s value (i.e., the distance from the lens center) of each imaging element is considered to be approximately equal. Therefore, for these arrangements, it is common to refer to the s value as being the distance of the image plane from the center of the lens.

Typically, in focus-based range determination methods, a depth estimate of a scene point is obtained by varying the focal-length (f) and/or the image plane distance (s). For simplicity, it will be assumed that the parameter being controlled is s. This means that the s value is changed by mechanically relocating the image plane, for example, by moving it towards or away from the lens to find the distance which causes the scene point to be in sharpest focus.

FIG. 1 depicts what is referred to as a sharp focus (SF) surface for a rectangular image plane imaged through a lens. The SF surface represents the set of scene points that will be imaged with sharp focus for some constant value of focal length (f) and focus distance (v). When an image is formed on an image plane which is perpendicular to the optical axis (assuming that the lens has no optical aberrations), the SF surface will be a surface that is approximately planar and normal to the optical axis (ignoring the depth of field effect). The size of the SF surface will be a scaled version of the size of the image plane, while its shape will be the same as that of the image plane. As the image plane distance from the lens, s, is changed, the SF surface moves away from or towards the camera. As a range of s values is traversed, the SF surface sweeps out a cone-shaped volume in three-dimensional space (the SF cone). The vertex angle of the SF cone represents the magnification or scaling achieved and is proportional to the f value. Since only those scene points within the SF cone can be imaged sharply, to increase the size of the imaged scene, the f value must be increased. Typically, however, the field of view (or frame) of an imaging apparatus is smaller than the entire visual field of interest, commonly referred to as a scene. Since in practice there is a limit on the usable range of f values, it is not possible to image a large scene in one viewing (or frame). Therefore, the camera must be panned to image different parts of the scene. "Panning" is the process of changing the parameters of an optical system to view a scene larger than that seen using some fixed parameter values. "Pan angle" is related to the parameters that are changed during "panning" and determines the part of the visual field being viewed by the optical system at any given time.

Consequently, typical range-from-focus techniques involve two mechanical steps. The first step involves sequentially panning over a range of pan angles to acquire images of the entire scene, a frame at a time. The second mechanical step involves, for each pan angle (or frame), finding the best focus distance or v value by mechanically relocating the image plane (for example, by moving it towards or away from the lens). The necessity for mechanically relocating the image plane to find the best v value for each pan angle makes this technique complex and time consuming, which is obviously undesirable.

Therefore, one drawback of the prior art is that it fails to provide an apparatus or method for determining a desired v value for each scene point, without conducting a dedicated mechanical search over a range of possible v values for each pan angle.

SUMMARY OF THE INVENTION

In view of the foregoing, it is an object of the present invention to overcome these and other drawbacks of the prior art.

Specifically, it is an object of the invention to provide a method and apparatus for performing high-speed range and/or focus determination over relatively large scenes.

It is another object to provide an improved method and apparatus for performing shape recognition for three-dimensional objects.

It is another object of the invention to provide a method and apparatus for performing high speed composition of a focused image of a scene.

In order to accomplish these and other objects of the invention, there is provided an imaging apparatus and method having an image surface which is adjustable with respect to a reference plane and which avoids the need for making multiple s value adjustments for each pan angle required to image a scene.

In prior imaging systems, the image plane is typically positioned such that all points on the image plane lie at a fixed distance (s) from a reference plane: Therefore, all scene points are imaged with approximately the same value of s, regardless of where on the image plane they are imaged, and regardless of the camera pan angle. According to one aspect of the present invention, an image surface is provided such that different image surface points are at different distances from a reference plane. Therefore, depending on the pan angle, the image will be formed on the image surface at different s values. By choosing the pan angles such that each frame is at least partially overlapped, each scene point will be imaged in a plurality of frames. By determining the pan angle which produces the sharpest focus for a scene point, the corresponding s value (and therefore the v value) can be determined. Based on the v value and the known f value, the lens law can be solved to determine the range (u value) of the scene point. Therefore, with such a structure, the two mechanical steps required by prior range-from-focus techniques can be replaced by the single mechanical step of controlling the pan angle, thereby greatly enhancing the speed of the process. It is to be understood that the term "scene point" is intended to describe broadly a portion of a scene, object or image and is not intended to be limited to a point.

According to one embodiment of the present invention, there is provided an imaging apparatus having an optical system and an imaging array. According to one aspect of this embodiment, the imaging array is mounted for rotational movement with two degrees of freedom and for translational movement with one or two degrees of freedom. This enables the elements of the imaging array to be located at different distances from a reference plane (for example, a plane passing through the lens center perpendicular to the optical axis). Preferably, the entire imaging apparatus is mounted for rotation about a predetermined axis (for example, an axis passing through the lens center perpendicular to the optical axis of the lens). When the imaging apparatus is rotated about the predetermined axis in a plurality of incremental steps, the imaging array generates a plurality of at least partially overlapping images (frames) of a scene. Therefore, each scene point will be detected in a plurality of frames, but by different elements of the imaging array in different frames. Due to the different s values of the imaging array elements, the scene point will be imaged with different degrees of focus in each of the plurality of frames. By determining the frame in which the scene point is in sharpest focus, and determining the pan angle corresponding to that frame, the v value for that scene point can be determined. From this, the u value can be calculated to determine the range of the scene point.

According to another embodiment, a similar apparatus is used, but a three-dimensional focussed scene is synthesized based on a determination of the best focus value for a plurality of scene points. For example, in most cases, if a scene contains a three-dimensional object, the object will have portions that are at different depth values (u). Therefore, not all of the points of the object can be in focus for a given v value. According to one embodiment of the present invention, by providing an imaging array having imaging elements located at different distances from a reference plane and panning the imaging array over a range of pan angles, a plurality of at least partially overlapped frames can be obtained. By determining the frame which contains the best focus criteria for each scene point, and using these scene point images, an image of the object can be synthesized, so that each point is in focus. This can be used to provide a focussed image of portions of an object at different depth values or for shape recognition.

With reference to FIG. 2, an example of how the s value of image array elements according to the present invention varies as a function of the pan angle is depicted. FIG. 2 depicts an image plane having a normal which makes an angle $\alpha$ with respect to the optical axis of the lens. Therefore, each of the imaging elements are at a different distance from the lens center (O). For a scene point (or object) which is located at an angle $\theta$ with respect to the optical axis, the scene point will be imaged by an imaging element at a point C on the image array. This corresponds to an s value equal to the length OC, where OC is the distance from the center of the lens (O) to an imaging element located at point C on the image plane. For a scene point at an angle $\theta$, the following relationships exist:

$$|\overrightarrow{OA}| = d$$
$$|AB| = d\tan\theta$$

$$|OB| = \frac{d}{\cos\theta}$$

$$|CB| = \frac{\alpha\delta\tan\theta}{\frac{\pi}{2} + \theta - \alpha}$$

$$\begin{aligned}|OC| &= |OB| - |CB| = s \\ &= \frac{d}{\cos\theta} - \frac{\alpha\delta\tan\theta}{\frac{\pi}{2} + \theta - \alpha}\end{aligned}$$

If the camera pivots by an angle $\phi$ about an axis passing through the lens center O, then the angle $\theta$ changes and the scene point will be imaged by a different imaging element(s) at a different point on the image array plane (C'). Therefore, the distance s between the center of the lens O and the new image point (C') on the image plane will also change. This distance (OC') will be given by the following equation.

$$|OC| = \frac{d}{\cos(\theta + \phi)} - \frac{\alpha\delta\tan(\theta + \phi)}{\frac{\pi}{2} + \theta + \phi - \alpha}$$

As the angle $\phi$ changes, the s value also changes. For some angle $\phi$, the scene point will be focused and as the angle keeps changing, the scene point will again go out of focus. By identifying the angle $\phi$ at which a scene point is in sharpest focus, the corresponding image distance (v) may be calculated, since by definition, this s value equals the v value. Thus, from the lens law, the depth value u can be determined.

As the imaging apparatus rotates about the lens center, new scene points are imaged and appear to enter from the left or right edge (depending on the direction of rotation) and some previously imaged scene points are discarded at the other edge. By appropriately overlapping the frames, for example, by controlling the pan angle $\phi$, the entire scene can be imaged, with each scene-point being imaged a plurality of times. In this way, the scene points can be ranged by completely rotating the camera once, without the need for moving the image plane to determine the v value for each pan angle.

Numerous autofocus methods and algorithms are known for determining when an object is focused (or at least imaged with the least amount of blur) according to predetermined focus criteria. These and other known focus determination techniques may be used with the present invention.

BRIEF DESCRIPTION OF THE DRAWINGS

FIGS. 2 and 2A are a depiction of various geometrical relationships which exist in an imaging system having an image plane which has a normal which is not parallel to the optical axis.

DETAILED DESCRIPTION OF THE PREFERRED EMBODIMENTS

Figure 3:
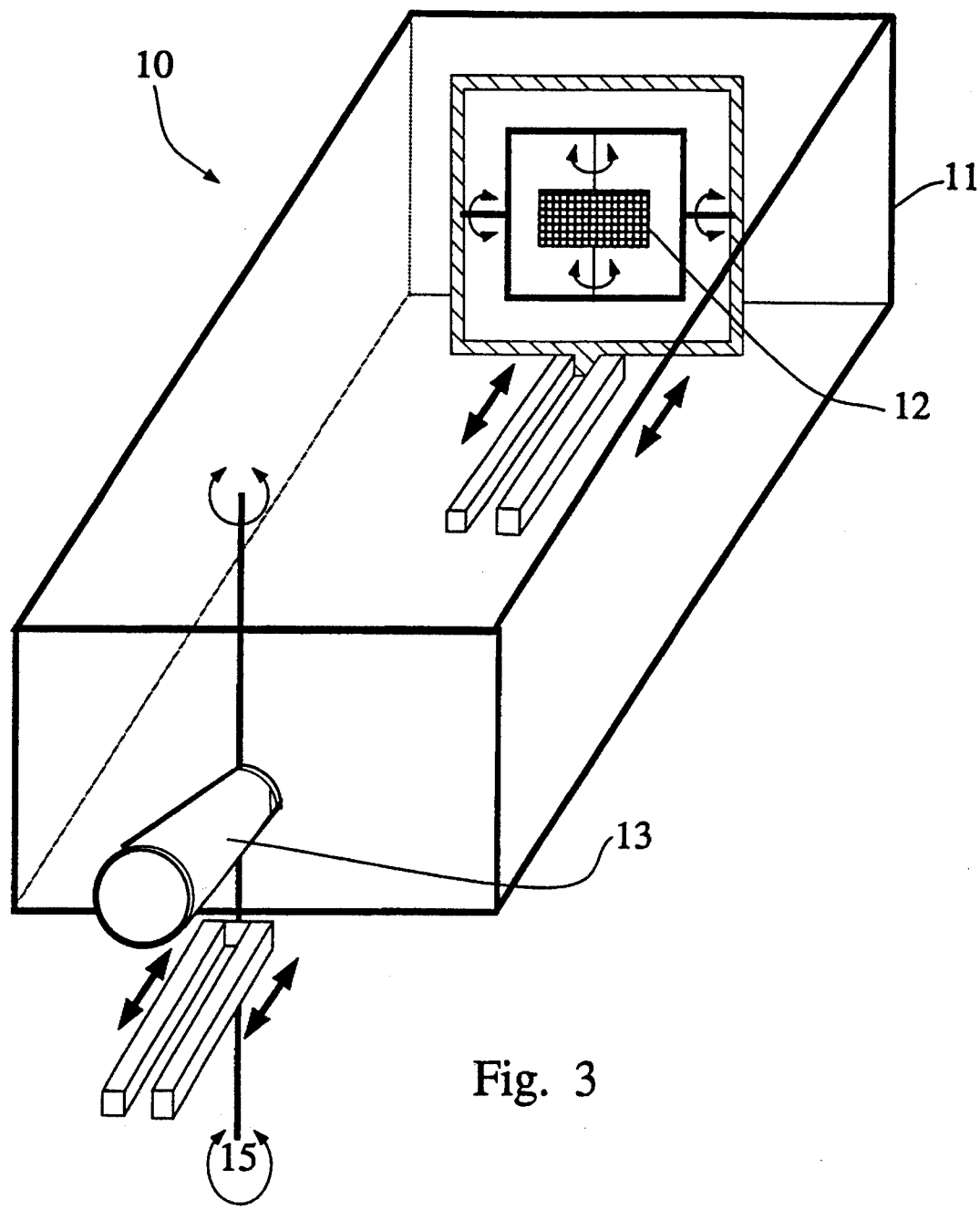
FIG. 3 is schematic illustration of an imaging apparatus according to one embodiment of the present invention.

With reference to the drawings, the preferred embodiments of the present invention will now be described. As shown for example in FIG. 3, one aspect of the invention relates to an imaging apparatus, generally indicated by reference numeral 10, comprising a housing 11, an imaging array 12 and an optical system 13. The imaging apparatus may be, for example, a CCD camera, although the invention is not so limited. The optical system may be a lens or a lens system. For simplicity, it will be assumed that the optical system is a simple lens. However, the invention is not so limited. The imaging array 12 comprises a plurality of imaging elements, for example, a plurality of linear CCD arrays, photodetectors, etc. The imaging array 12 is mounted with two rotational degrees of freedom and preferably with one translational degree of freedom. The three degrees of freedom enable the plurality of individual elements of the imaging array to be located at predetermined different distances from a reference plane. For convenience, a reference plane passing through the lens center, perpendicular to the optical axis of the lens, will be discussed. The imaging array 12 is connected to read out and processing circuitry discussed below. The rotation may be accomplished manually or under processor control in a known manner.

For a given predetermined orientation of the imaging array 12 with respect to reference plane (and/or optical axis), individual imaging elements of the array will be located at different but known distances from the reference plane. If the entire imaging apparatus 10 is rotated in sequential predetermined steps, about a predetermined axis (for example, by controlling a stepper motor to cause rotation about a vertical axis 15 passing through the lens center), then an entire scene can be sequentially imaged by a plurality of frames. By choosing the angle of rotation corresponding to each frame to be sufficiently small, each scene point will be imaged in a plurality of frames, but by different imaging elements for each frame. Since the imaging elements are located at different but known distances from the reference plane (i.e., at different s values), by determining the focus criteria value for the scene point for each frame in which it is imaged, and comparing the plurality of focus criteria values for a particular scene point, the frame containing the best focus criteria value for that scene point can be determined. By indexing each frame to the pan angle corresponding to the frame, the s value of the imaging element(s) corresponding to the best focus condition for the scene point can be determined based on the geometrical relationships discussed above with respect to FIG. 2. Since, by definition, the s value which yields the best focus condition is equal to the v value, based on this information and the known f value, the range (or u value) can be determined. By performing this analysis for each scene point or scene portions of interest, the range of each point or portion of interest can be determined.

Figure 1:
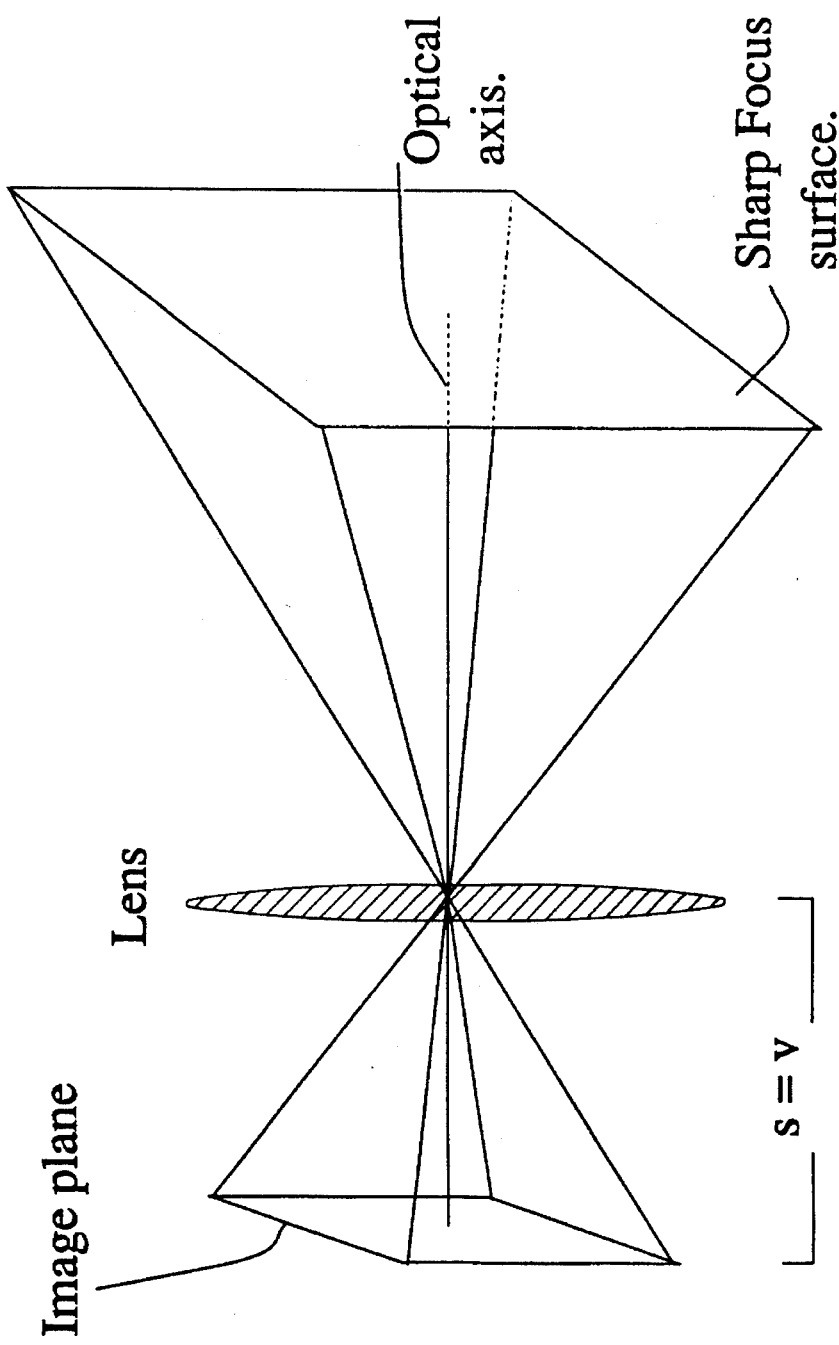
FIG. 1 is a schematic illustration of an imaging system and a sharp focus surface.
Figure 2:
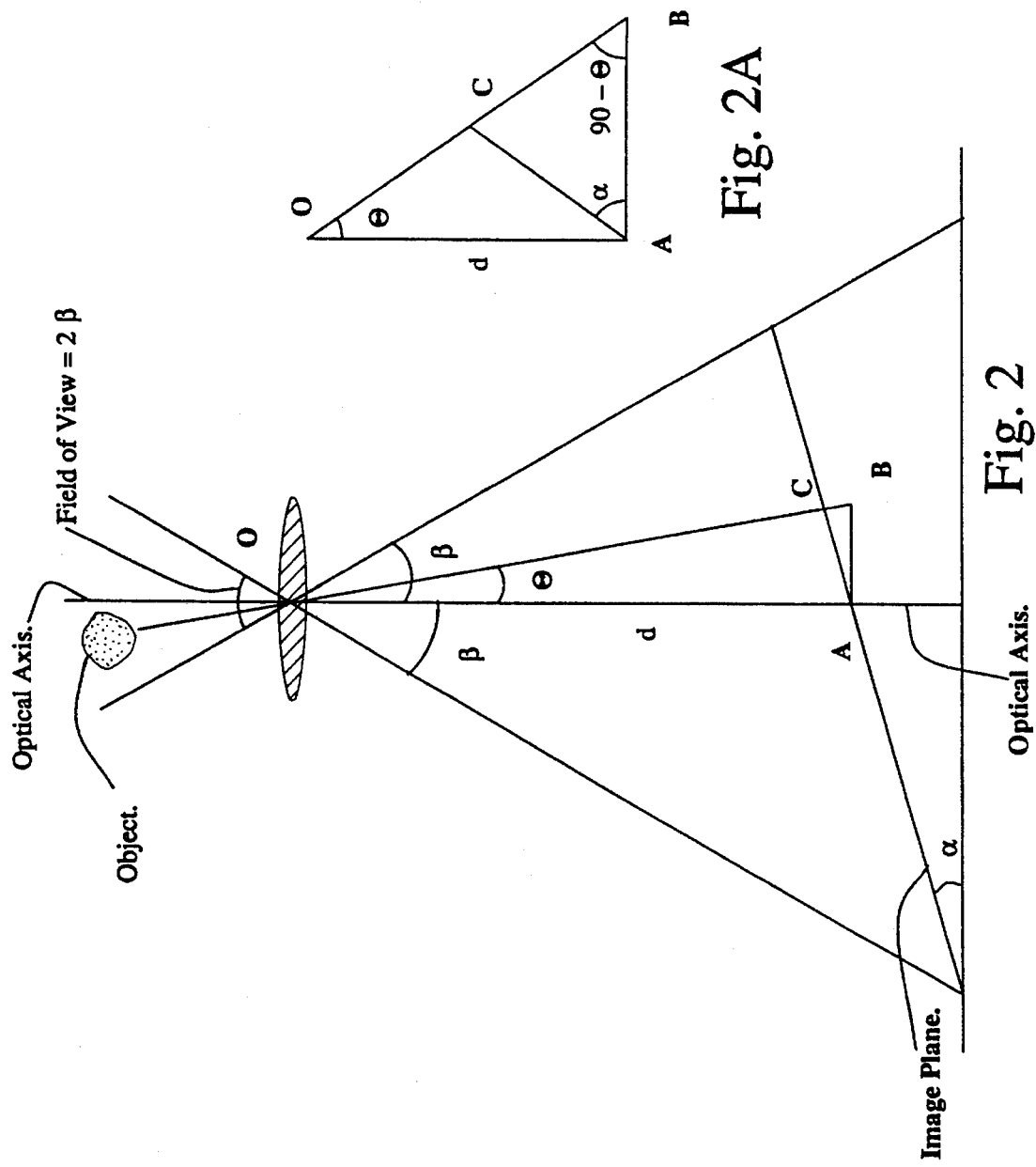
Figure 4:
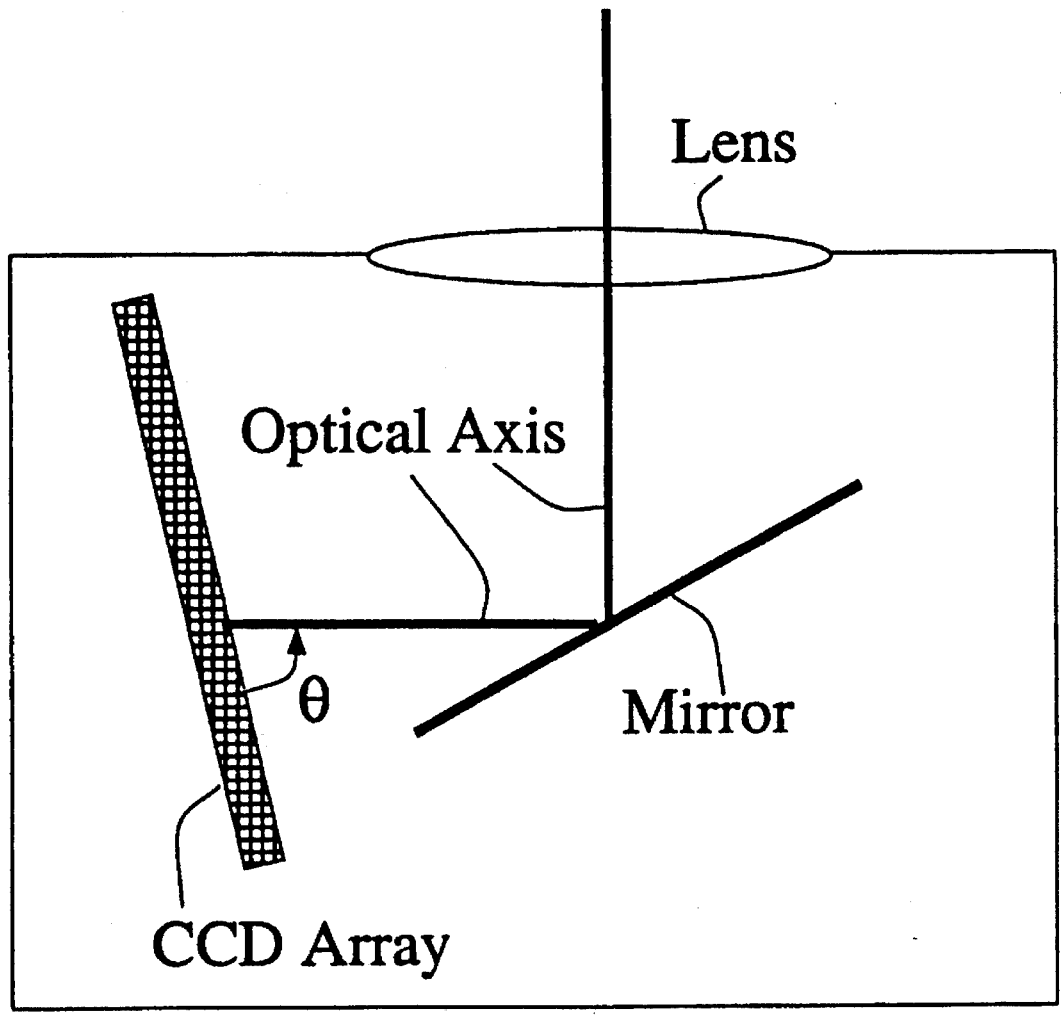
FIGS. 4A–4K depict some examples of alternative image array geometries which may be used with the present invention and an alternative arrangement for effectively producing such geometries.

For sake of example, FIG. 2 depicts a simple case of an imaging apparatus having an image array configured as a plane which has a normal which is not parallel with the optical axis of the lens. However, the invention is not so limited. Other image array geometries may be used. Generally speaking, any image array geometry wherein the various image elements are at different predetermined distances from a reference plane may be used. Some examples of alternative geometries are shown in FIGS. 4A–4J. These geometries may be achieved by physical arrangement of the image elements of the array or by effectively producing such geometries by use of a controllable mirror, in a manner generally known in the art. An example of such an arrangement is shown in FIG. 4K.

Figure 5:
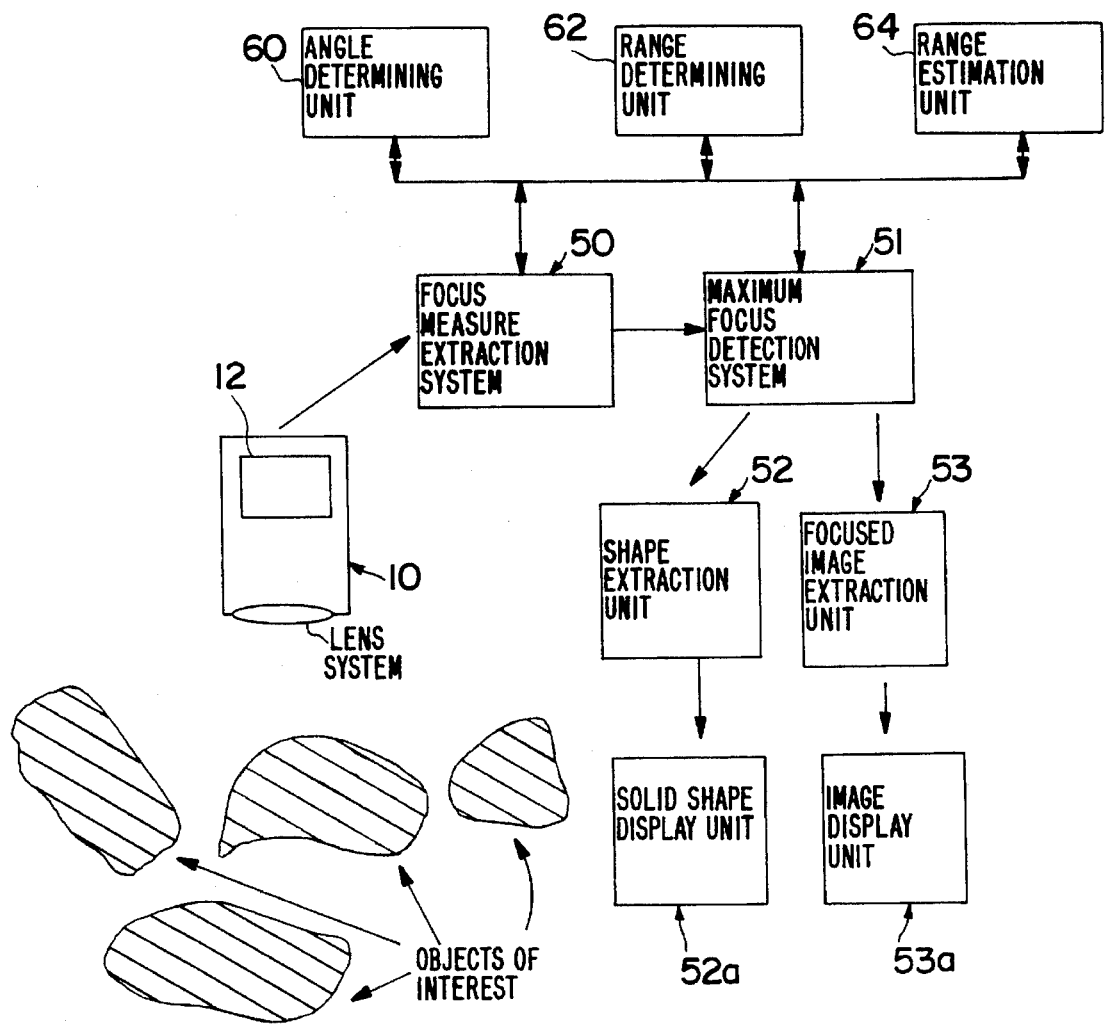
FIG. 5 is a schematic illustration and block diagram of an imaging apparatus and processing circuitry according to one embodiment of the present invention.

FIG. 5 depicts a schematic illustration and block diagram of an example of one embodiment of the read-out and processing circuitry according to the present invention. The imaging apparatus 10, including the imaging array 12 and a number of objects of interest, are depicted. The imaging array 12 is operatively connected in a known manner to a processor for processing the outputs of the imaging elements. In addition to standard processor components, the processor includes a focus measure extraction system 50, which is connected to maximum focus criteria determining system 51, which in turn is selectively connected to a shape extraction unit 52 and a focused image extraction unit 53. The shape extraction unit 52 may be connected to a shape display unit 52a. The focused image extraction unit 53 may be connected to an image display unit 53a. Alternatively, the subpart may be a stereo display unit.

Figure 6:
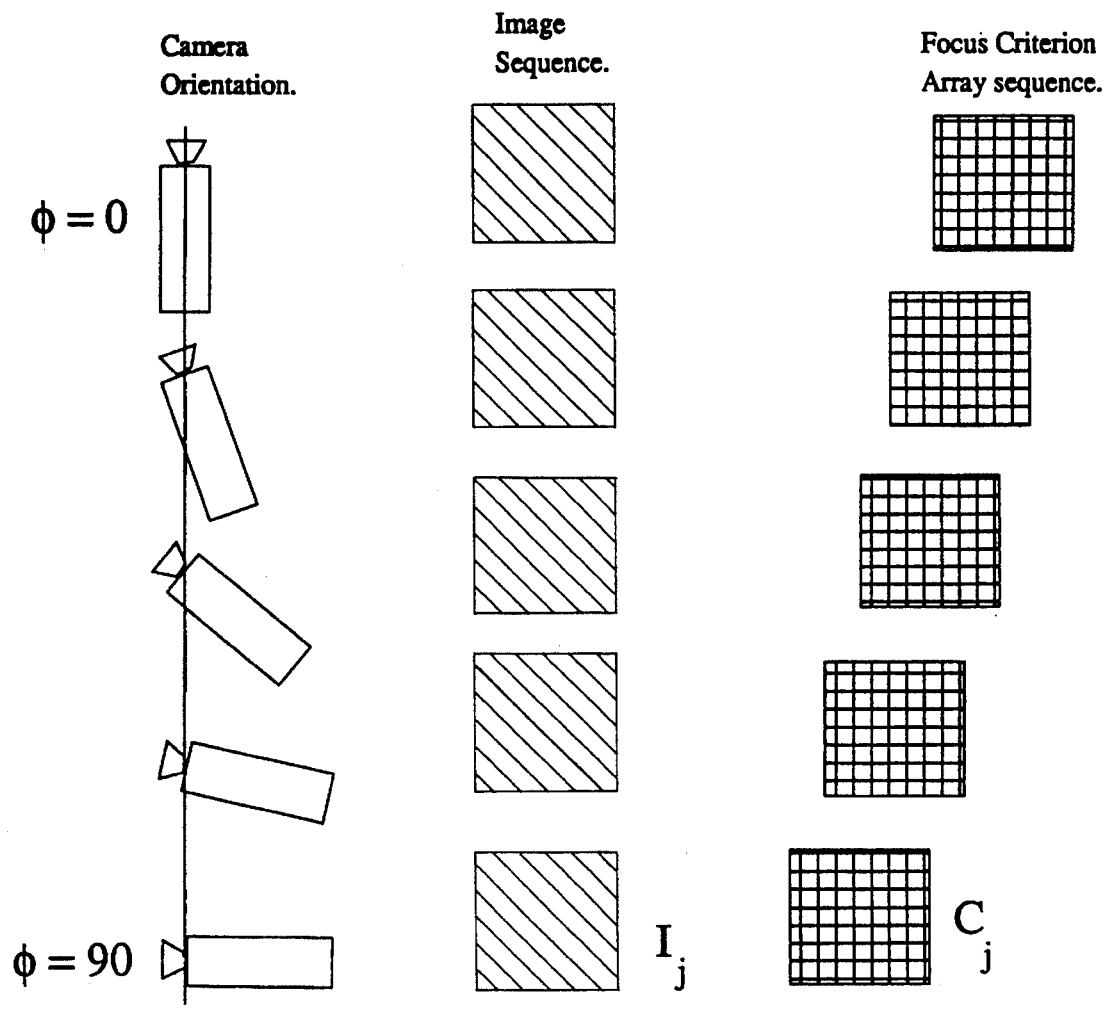
FIGS. 6A–6D are schematic illustrations of various steps performed according to one embodiment of the present invention.
Figure 6:
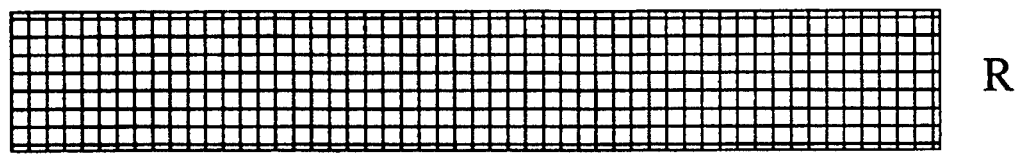

With reference to FIGS. 6A–6D, the operation of the circuitry of FIG. 5 and the overall operation of the present invention will be described. As shown in FIG. 6, the imaging apparatus 10 may be rotated through a range of angles ($\phi$) in order to obtain imaging information for an object or scene of interest. For purposes of simplicity, FIG. 6A shows the imaging apparatus 10 being varied from an angle of $\phi=0°$ to $\phi=90°$. However, the invention is not so limited. Various other angles and various other ranges of angles may be preferred, depending on the particular application. Additionally, for simplicity, the imaging apparatus has been shown as including five steps between the angles of $\phi=0°$ and $\phi=90°$, inclusive. In practice, depending upon the resolution and other factors (which will be readily apparent to one of ordinary skill in the art), a greater or lesser number of steps may be desired. Preferably, however, the number of steps and the range of angles are related such that each scene point is imaged in a plurality of frames. In operation, at each step, or pan angle ($\phi$), the imaging apparatus acquires an image, or frame, corresponding to its field of view (FIG. 6B). This information is stored and is indexed to the pan angle. Using focus detection algorithms which are readily known to those of skill in the art (either after all frames are stored or while the frames are being stored), each frame is analyzed to generate a focus criteria array sequence (FIG. 6C). The focus array criteria sequence includes focus information for each scene point of interest for each frame. Since the imaging apparatus is stepped or panned in known increments, the offset for each frame can be determined. By aligning the focus criteria arrays with the appropriate offset (FIG. 6C), corresponding portions (e.g., vertical segments) of the focus criteria array will correspond to a common portions (e.g., scene points) of a scene. By comparing the focus criteria array sequences to determine which frame contains the best focus criteria values for each scene point, the v value for each scene point can be determined in the manner as discussed above. From this, the range of each scene point (u value) can be determined.

Alternatively, by generating a range map array (FIG. 6D), a focused image of a scene or object having scene points at varying distances can be generated. In the range map array, each element corresponds to a scene point. The range map array is generated by storing the focus criteria values calculated for that scene point. By indexing the value in the range map array with the elements and frames from which they came, a focused image of a three dimensional object can be generated and displayed. Alternatively, the information may be used to generate information concerning the shape of the object which may be used, for example, in object or shape recognition systems.

For example, assume that an image array contains an N×N array of pixels, the range map is an array of size N×bN, where b is greater than or equal to 1 and depends on the width of a scene to be imaged, the $k^{th}$ image frame is represented by $I_k$ and the cumulative, environment-centered range map with its origin at the camera center is represented by R. Every element in the range array contains the focus criterion values for different image indices, i.e., for different pan angles. When the stored criterion value shows a maximum, then the index corresponding to the maximum can be used to determine the range for that scene point, as discussed above. For example, the index can correspond to the camera rotation angle at which the image was sharply focussed. Using the focus and column indices for the range point and the image index, the distance from the lens to the image plane (v) can be determined and based on the lens law, the range can be calculated.

More specifically, as shown in FIG. 6A, the imaging apparatus 10 preferably starts at one side of a scene and pans, in incremental predetermined steps (pan angles), to the other side. Prior to panning, the arrays are initialized. At each pan angle, an image Ij (j:1+n, where n is the number of images to be captured) is captured. Each image is passed through a focus criterion filter (in a known manner) to yield an array $C_j$ of focus criterion values. Based on the known angle φ (which is the angle that the camera has turned from its starting position), the offset is calculated to enable corresponding scene points to be compared from frame to frame. This enables the images to be aligned with the other images. For example, Pixel $I_j$[50][75] might correspond to the same scene point as pixels $I_{j+1}$[50][125] and $I_{j+2}$[50][175]. That is to say if there is an offset of 50 units between frames, a scene point which is imaged by a pixel in row 50, column 75 of frame $I_j$, will correspond to a scene point imaged by a pixel in row 50 column 125 of the next frame and row 50, column 175 of the following frame. The offsets do not need to be equal from frame to frame but they must be known and indexed. The offsets for individual pixels with a frame may also be different, if desired. If not already done, the camera is rotated by a small predetermined angle, φ and j are updated and this process is repeated until the entire scene of interest is imaged.

According to one embodiment, a standard CCD camera may be modified such that its image plane is pivotally controllable with respect to the optical axis of the lens and the camera may then be mounted on a rotation platform, such that the axis of rotation of the platform passes through the lens center. Four linear stages (not shown in the figure) which may be motor controlled (automatically or manually) in a known manner are provided. Two stages adjust the position of the image plane angle motor inside the camera. A third stage controls the height of the CCD board from the bottom of the camera (to align it with the lens). The fourth stage controls the position of the camera in relation to the camera pivot axis. Rough calibration of the camera may be performed in a known manner by finding the point of intersection of the optical axis and the image plane and bringing the intersection point to the image center by adjusting the linear stages as necessary, prior to operation.

Since the camera implements a range-from-focus approach, the scene surfaces of interest must have texture so image sharpness can be measured. For scenes which do not have sufficient texture or features, auxiliary illumination may be used to create textures/features on the object, as is known in the art. The confidence of the estimates improves with the amount of surface texture present. Further, the reliability of estimates is inherently a function of the range to be estimated. However, range estimation using the proposed approach is much faster than traditional range-from-focus approaches, thus eliminating one of the major drawbacks.

The foregoing is a description of the preferred embodiments of the present invention. Various modifications and alternatives within the scope of the invention will be readily apparent to one of ordinary skill in the art. The invention is only limited by the claims appended hereto.

We claim:

1. An imaging apparatus comprising:

a lens having an optical axis and a lens center;

image-detecting means comprising an image surface, wherein an axis normal to said image surface makes a non-zero angle α with respect to said optical axis;

means for relatively varying the image-detecting means with respect to said optical axis to cause the non-zero angle α to be a predetermined value;

means for rotating the imaging apparatus about a predetermined axis through a plurality of predetermined positions;

means, responsive to said image-detecting means, for obtaining a focus information condition for a plurality of scene points at a plurality of the predetermined positions; and focus determining means, responsive to said means for obtaining a focus information condition, for comparing the focus information conditions obtained for the scene points at the predetermined positions and selecting a predetermined position which corresponds to a desired focus condition for individual scene points.

2. The imaging apparatus of claim 1 further comprising range determining means, responsive to said means for obtaining a focus information condition, for determining a range from at least one scene point to the imaging apparatus.

3. The imaging apparatus of claim 1 wherein said means for rotating said imaging apparatus rotates said imaging apparatus about an axis through the lens center.

4. The imaging apparatus of claim 2 wherein at least one of said scene points is a scene point of an object and said range determining means is responsive to said focus determining means for determining a range from said object to the imaging apparatus based on said at least one predetermined position which corresponds to said desired focus condition for at least one scene point.

5. The imaging apparatus of claim 1 wherein said means for obtaining focus information obtains focus information for a plurality of at least partially overlapping frames of a scene, said scene comprising said plurality of scene points, and wherein said predetermined positions are chosen to ensure that at least one of said scene points is imaged in a plurality of the frames.

6. An imaging apparatus comprising:

a housing;

optical means located within said housing and having an optical axis;

imaging means having a plurality of imaging elements located at predetermined distances with respect to said optical means, said plurality of imaging elements comprising an image surface, wherein an axis normal to the image surface makes a non-zero angle α with respect to the optical axis;

means for rotating the imaging apparatus about a predetermined axis through a plurality of predetermined positions;

means, responsive to the imaging means, for obtaining a focus information condition for a plurality of scene points of a plurality of at least partially overlapping frames of a scene, each frame comprising scene points imaged at one of the predetermined positions; and focus determining means, responsive to the means for obtaining a focus information condition, for comparing the focus information conditions obtained for the scene points at the predetermined positions and selecting a predetermined position which corresponds to a desired focus condition for individual scene points.

7. The imaging apparatus of claim 6 further comprising:

range determining means, responsive to the focus determining means, for determining the range from a scene point to said imaging apparatus.

8. The imaging apparatus of claim 6 further comprising means, responsive to the focus determining means, for generating a focussed image of said scene points.

9. In an imaging apparatus comprising a lens having an optical axis and a lens center and an image-detecting means for detecting images of frames of a scene, the image-detecting means comprising an image surface, wherein an axis normal to the image surface makes an angle α with respect to said optical axis, a method comprising the steps of:

predetermining a value of the angle α for said image surface; rotating said imaging apparatus about a predetermined axis through a plurality of predetermined positions;

generating an image of a frame at the predetermined positions:

obtaining a focus information condition from the images for a plurality of scene points of a plurality of at least partially overlapping frames;

comparing the plurality of focus information conditions obtained for at least one scene point at a plurality of the predetermined positions; and determining a predetermined angle which corresponds to a desired focus condition for the at least one scene point.

10. The method of claim 9 further comprising the step of determining a range from at least one scene point to the imaging apparatus based on the predetermined position which corresponds to said desired focus condition for the at least one scene point.

11. The method of claim 9 further comprising the step of generating a focused image of said scene points.

12. An imaging apparatus comprising:

a housing;

optical means located within said housing;

imaging means having a plurality of imaging elements located at predetermined distances with respect to said optical means, the imaging elements comprising an image surface, a surface normal to the image surface making a non-zero angle α with respect to an axis through said optical means;

means for rotating the housing through a plurality of predetermined positions;

focus obtaining means, responsive to the imaging means, for obtaining a focus information condition for a plurality of scene points of a plurality of at least partially overlapping frames of a scene;

focus comparing means, responsive to the focus obtaining means, for comparing the focus information for the scene points at the plurality of predetermined positions; and angle determining means responsive to the focus comparing means for selecting at least one of the predetermined angles which corresponds to a desired focus criterion for at least one scene point.

13. The imaging apparatus of claim 12, wherein said optical means comprises a lens having a lens center and wherein said means for rotating rotates said housing about an axis through said lens center.

14. The imaging apparatus of claim 12 further comprising:

range determination means responsive to said angle determining means for determining a range from at least one scene point to the imaging apparatus.

15. The imaging apparatus of claim 13 further comprising:

range estimation means responsive to said imaging means for estimating a range to said imaging apparatus for at least one of said plurality of scene points.

16. In an imaging apparatus for imaging an image, said imaging apparatus comprising a lens having an optical axis and a lens center and an imaging means having a plurality of imaging elements, a method comprising the steps of:

predetermining an arrangement of the plurality of image elements with respect to said optical axis;

moving said imaging elements through a plurality of predetermined positions;

detecting a frame of said image with said plurality of imaging elements at each of said predetermined positions, each frame consisting essentially of a plurality of scene points;

obtaining a focus information condition from the images provided by the imaging means for a plurality of scene points of a plurality of at least partially overlapping frames;

comparing the focus information conditions obtained for each scene point at the plurality of predetermined positions; and selecting at least one of said predetermined positions which corresponds to a desired focus condition for at least one scene point.

17. The method of claim 16 wherein said imaging apparatus is rotated about an axis through the lens center.

18. The method of claim 16 further comprising the step of determining a range of said at least one scene point based on said at least one predetermined position which corresponds to said desired focus condition for that scene point.

19. The method of claim 16 further comprising the step of generating a focused image of said scene points.

20. An imaging apparatus comprising:

a lens having an optical axis and a lens center;

image-detecting means comprising an image surface, wherein an axis normal to the image surface makes an angle $\alpha$ with respect to said optical axis;

processor means for processing images detected by the image-detecting means;

means for rotating the image-detecting means through predetermined positions about an axis through the lens center; and means, responsive to the image-detecting means, for obtaining a focus information condition for scene points of a plurality of at least partially overlapping frames of a scene; and focus determining means, operatively connected to the means for obtaining a focus information condition, for comparing the focus information conditions obtained for selected scene point at a plurality of the predetermined positions and selecting a predetermined position at which a desired focus condition exists for the selected scene points.

21. An imaging apparatus comprising:

a lens having an optical axis and a lens center;

image-detecting means comprising an image surface, an axis normal to the image surface making an angle $\alpha$ with respect to said optical axis;

means for rotating said image-detecting means through a plurality of predetermined positions;

means, responsive to the image-detecting means, for obtaining an information condition for a plurality of scene points of a plurality of at least partially overlapping frames of a scene, imaged at one of the predetermined positions: and means for comparing the information obtained for a first scene point of said plurality of scene points from a plurality of the frames and selecting at least one frame corresponding to a desired condition for said first scene point.

22. The imaging apparatus of claim 21 wherein the desired condition is a focus criteria value.

23. The imaging apparatus of claim 21 further comprising means for varying the angle $\alpha$ to be a predetermined value.

* * * * *

UNITED STATES PATENT AND TRADEMARK OFFICE
CERTIFICATE OF CORRECTION

PATENT NO. : 5,453,784
DATED : September 26, 1995
INVENTOR(S) : Arun KRISHNAN et al.

It is certified that error appears in the above-indentified patent and that said Letters Patent is hereby corrected as shown below:

Column 1, Before the first line and after the title, insert the following paragraph:

"At least a part of the work relating to the invention was performed with United States Government support through the National Science Foundation and Defense Advanced Research Projects Agency under grant IRI-89-02728 and the United States Army Construction Technology Center under grant DAAL 03-87-K-0006. The United States Government may have certain rights in the invention."

Signed and Sealed this

Twenty-third Day of April, 1996

*Attest:*

BRUCE LEHMAN

*Attesting Officer*     Commissioner of Patents and Trademarks